United States Patent
Sachs

(10) Patent No.: US 10,362,067 B2
(45) Date of Patent: Jul. 23, 2019

(54) METHOD OF AND SYSTEM FOR PRIVACY AWARENESS

(71) Applicant: Swim.IT Inc., San Jose, CA (US)

(72) Inventor: Christopher David Sachs, Sunnyvale, CA (US)

(73) Assignee: Swim.IT Inc, San Jose, CA (US)

(*) Notice: Subject to any disclaimer, the term of this patent is extended or adjusted under 35 U.S.C. 154(b) by 0 days.

(21) Appl. No.: 15/256,055

(22) Filed: Sep. 2, 2016

(65) Prior Publication Data

US 2017/0070539 A1 Mar. 9, 2017

Related U.S. Application Data

(60) Provisional application No. 62/214,786, filed on Sep. 4, 2015.

(51) Int. Cl.
*H04L 29/06* (2006.01)
*G06F 16/22* (2019.01)
(Continued)

(52) U.S. Cl.
CPC ............ *H04L 63/205* (2013.01); *G06F 16/22* (2019.01); *G06F 21/121* (2013.01); *G06F 21/31* (2013.01); *G06F 21/604* (2013.01); *G06F 21/6254* (2013.01); *G06Q 30/0277* (2013.01); *H04L 45/70* (2013.01); *H04L 51/04* (2013.01); *H04L 51/12* (2013.01); *H04L 51/14* (2013.01); *H04L 61/2069* (2013.01); *H04L 63/0227* (2013.01); *H04L 67/101* (2013.01);
(Continued)

(58) Field of Classification Search
CPC . H04L 63/205; H04L 67/104; H04L 63/0227; H04L 67/101; H04L 45/70; H04L 51/04; H04L 51/12; H04L 51/14; H04L 61/2069; G06F 21/121; G06F 21/6254; G06F 17/30312; G06F 21/31; G06Q 30/0277
See application file for complete search history.

(56) References Cited

U.S. PATENT DOCUMENTS 6,275,824 B1* 8/2001 O'Flaherty .......... G06F 21/6227
8,181,254 B1* 5/2012 Kay ....................... G06F 21/121
713/168

(Continued)

FOREIGN PATENT DOCUMENTS

WO 2014205431 A2 12/2014

OTHER PUBLICATIONS

Fink et al., "Application of Machine Learning and Crowdsourcing to Detection of Cybersecurity Threats", Feb. 2011, Preceedings of the DHS Science Conference Fifth Annual University Network Summit, Carnegie Mellon University.*

(Continued)

*Primary Examiner* — John B King
(74) *Attorney, Agent, or Firm* — Haverstock & Owens LLP

(57) ABSTRACT

A privacy awareness method and system observes data collection by third parties on websites and applications and determines what privacy metadata is retrieved and/or sent and where the privacy metadata is sent. The privacy awareness method and system informs users about the privacy information collection, so that users are able to better understand what information is being retrieved and navigate the Internet accordingly.

33 Claims, 3 Drawing Sheets

(51) Int. Cl.
*G06Q 30/02* (2012.01)
*H04L 12/721* (2013.01)
*H04L 12/58* (2006.01)
*H04L 29/12* (2006.01)
*H04L 29/08* (2006.01)
*G06F 21/12* (2013.01)
*G06F 21/31* (2013.01)
*G06F 21/60* (2013.01)
*G06F 21/62* (2013.01)
*H04L 12/26* (2006.01)
*H04L 12/803* (2013.01)

(52) U.S. Cl.
CPC .... *H04L 67/104* (2013.01); *G06F 2221/2141* (2013.01); *G06F 2221/2149* (2013.01); *H04L 43/0894* (2013.01); *H04L 47/125* (2013.01); *H04L 51/34* (2013.01); *H04L 61/1541* (2013.01); *H04L 63/0407* (2013.01)

(56) References Cited

U.S. PATENT DOCUMENTS

| | | | | |
|---|---|---|---|---|
| 8,898,808 | B1* | 11/2014 | Kittrell | H04L 63/10 726/30 |
| 9,510,036 | B1* | 11/2016 | Lewis | H04N 21/26258 |
| 9,699,133 | B2* | 7/2017 | Le Jouan | H04L 51/28 |
| 9,703,988 | B1* | 7/2017 | Sudbury | G06F 21/64 |
| 9,721,108 | B2* | 8/2017 | Krishnamurthy | G06F 21/60 |
| 2003/0088520 | A1* | 5/2003 | Bohrer | G06Q 10/10 705/74 |
| 2003/0131052 | A1* | 7/2003 | Allan | H04L 29/06 709/203 |
| 2003/0158940 | A1 | 8/2003 | Leigh | |
| 2004/0139025 | A1 | 7/2004 | Coleman | |
| 2006/0253580 | A1* | 11/2006 | Dixon | G06F 21/50 709/225 |
| 2007/0266079 | A1 | 11/2007 | Criddle | |
| 2007/0282832 | A1 | 12/2007 | Herley | |
| 2008/0016198 | A1 | 1/2008 | Johnston-Watt et al. | |
| 2008/0114739 | A1* | 5/2008 | Hayes | G06F 17/30864 |
| 2008/0115214 | A1* | 5/2008 | Rowley | G06F 21/31 726/22 |
| 2009/0100322 | A1* | 4/2009 | Phillips | G06F 17/30902 715/205 |
| 2010/0088170 | A1* | 4/2010 | Glore, Jr. | G06Q 10/00 705/14.19 |
| 2010/0094860 | A1* | 4/2010 | Lin | G06Q 30/02 707/709 |
| 2010/0185656 | A1* | 7/2010 | Pollard | G06F 21/6245 707/769 |
| 2011/0022681 | A1* | 1/2011 | Simeonov | G06Q 30/02 709/217 |
| 2011/0055368 | A1 | 3/2011 | Colrain et al. | |
| 2011/0126290 | A1* | 5/2011 | Krishnamurthy | G06F 21/6263 726/26 |
| 2011/0173071 | A1* | 7/2011 | Meyer | G06Q 30/02 705/14.54 |
| 2011/0295988 | A1* | 12/2011 | Le Jouan | G06F 21/31 709/223 |
| 2012/0023133 | A1* | 1/2012 | Yeon | G06Q 30/00 707/770 |
| 2012/0084349 | A1 | 4/2012 | Lee | |
| 2013/0145375 | A1 | 6/2013 | Kang | |
| 2013/0151547 | A1* | 6/2013 | Queck | G06F 17/30867 707/767 |
| 2013/0238742 | A1* | 9/2013 | Kay | G06F 9/5016 709/213 |
| 2013/0318199 | A1* | 11/2013 | Le Jouan | H04L 67/02 709/217 |
| 2014/0032707 | A1* | 1/2014 | Doshi | G06F 9/542 709/217 |
| 2014/0195626 | A1* | 7/2014 | Ruff | H04L 63/104 709/206 |
| 2014/0324843 | A1* | 10/2014 | Rapoport | G06F 17/30241 707/724 |
| 2014/0337466 | A1* | 11/2014 | Li | H04L 63/0407 709/217 |
| 2014/0379428 | A1* | 12/2014 | Phansalkar | G06Q 30/0202 705/7.32 |
| 2015/0178769 | A1* | 6/2015 | Mirisola | H04L 63/0421 705/14.45 |
| 2016/0300231 | A1* | 10/2016 | Shavell | G06Q 20/4016 |
| 2017/0004573 | A1* | 1/2017 | Hussain | G06F 21/552 |
| 2017/0116642 | A1* | 4/2017 | Meyer | G06Q 30/0256 |
| 2017/0286719 | A1* | 10/2017 | Krishnamurthy | G06F 21/6263 |

OTHER PUBLICATIONS

International Search Report from PCT/US16/50204.

* cited by examiner

US 10,362,067 B2

METHOD OF AND SYSTEM FOR PRIVACY AWARENESS

CROSS-REFERENCE TO RELATED APPLICATION(S)

This application claims the benefit of U.S. Provisional Patent Application Ser. No. 62/214,786, filed Sep. 4, 2015, and titled "PRIVACY AWARENESS APPLICATION, LIVE PRIVACY POLICY, AND DISTRIBUTED AND MULTI-PLEXED PEER TO PEER REAL-TIME MESSAGING UTILIZING BACK PRESSURE SIGNALLING," which is hereby incorporated by reference in its entirety for all purposes.

FIELD OF THE INVENTION

The present invention relates to the field of privacy and security. More specifically, the present invention relates to online privacy and security associated with a third-party (partners and affiliates of website owners).

BACKGROUND OF THE INVENTION

Today's websites and web application interaction model involve a browser retrieving data over the Internet (e.g., WWW) from advertisers, data collectors, content delivery networks and enterprise servers. Interaction model refers to the flow of data and control between various entities. Browsers displaying the web application or website user interfaces directly interact with many types of systems on the internet (e.g., advertiser systems). The common perception is that the website or web application is driven from the software residing on enterprise servers. This might be the case for enterprises that are business-centric, but consumer-centric enterprises work with many partners and affiliates (e.g., Google Analytics, a data collector), and therefore the data and control flow is dynamically constructed based on the consumer activity on the website or web application.

This dynamic interaction model is important for implementation of today's business strategies. Unfortunately, there are people and businesses that are taking advantage of this model to collect and misuse consumer data that can lead to privacy and security issues.

Enterprises are providing free products (e.g., email application) and services in exchange for the right to collect user/consumer information. This was the start of consumer data privacy problems, and today this data collection is being taken advantage of by third-parties (partners, affiliates and others) without direct consent of users/consumers. Key problems associated with data collection are:

1. Users/Consumers do not have an explicit understanding of specific data that is being collected, stored, used, shared and for what purpose. This data is being monetized by the collecting enterprises. If consumers are aware of specifics and the associated opportunity cost then they can make a more informed decision about using these free products and services.

2. Consumers have a very limited or no understanding of data being collected by third-parties. This data is typically Personally Identifiable Information (PII) and Personality Profiling Information (PPI). This data is being monetized and misused by the collecting third-parties. If consumers are aware of what is being collected by these third-parties then they can opt-out or inform the enterprises to stop this data collection.

SUMMARY OF THE INVENTION

A privacy awareness method and system observes data collection by third parties on websites and applications and determines what privacy metadata is retrieved and/or sent and where the privacy metadata is sent. The privacy awareness method and system informs users about the privacy information collection, so that users are able to better understand what information is being retrieved and navigate the Internet accordingly.

DETAILED DESCRIPTION OF THE PREFERRED EMBODIMENT

A privacy awareness method and system includes a software application that non-intrusively observes the data collection of websites and web applications when users/consumers interact with a website or a web application and builds a dataset of privacy related data collection metadata.

The software application(s) for building a dataset of privacy-related data collection metadata involves the following software components: a web browser extension module that non-intrusively observes the data collection of websites and web applications, a suite of software components on the server side that capture and process in realtime the data collection instructions to determine the associated metadata, and a suite of software components that store the metadata for reporting data to the users/consumers and enterprises.

Figure 1:
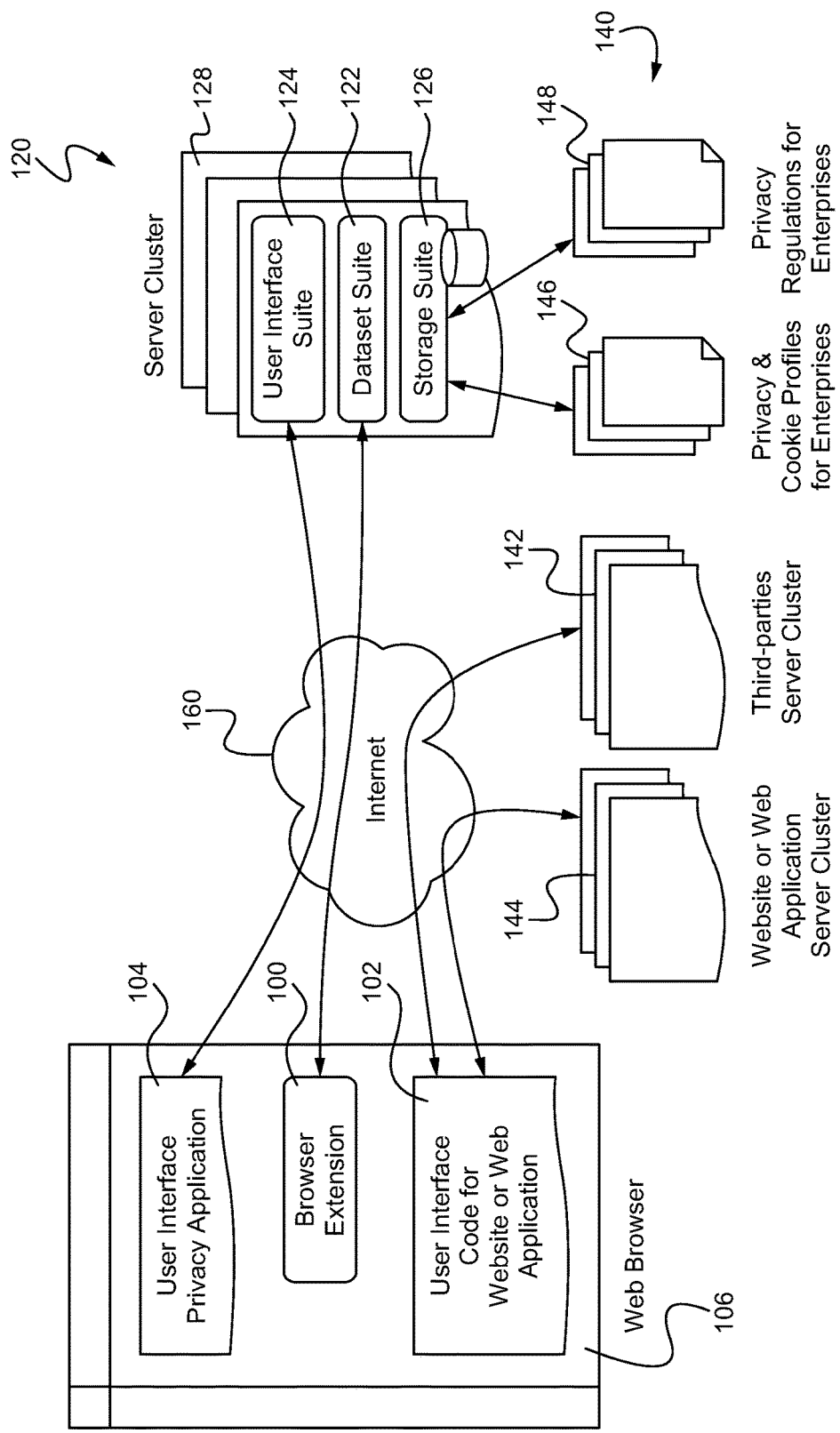
FIG. 1 illustrates a diagram of the privacy awareness application according to some embodiments.

FIG. 1 illustrates a diagram of the privacy awareness application according to some embodiments. The privacy application includes a web browser extension module 100, a suite of software components on the server side 120 and a suite of software components that store metadata 140.

The web browser extension module 100 (Privacy Awareness Extension), which is installed to work as part of a web browser 106 (e.g., Chrome, Firefox, IE, Safari), observes data collection by user interfaces of websites and web applications 102. The user interfaces of websites and web applications 102 are able to include enterprise and enterprise affiliates data, code, scripts, images and video content that is shown on a website and a web application user interface to users/consumers. The web browser extension module 100 is used to crowdsource privacy data collection by various websites and web applications. Users/Consumers downloading and using the browser extension 100 are able to anonymously contribute the metadata associated with private data that is being collected, and this metadata is available to all users/consumers around the world.

The server side 120 includes one or more servers 128 which are able to store and process a user interface suite 124, a dataset suite 122 and a storage suite 126. The dataset suite software 122 processes data collection scripts to generate the privacy metadata dataset. The storage suite software 126 stores privacy metadata dataset such as: collected privacy metadata such as metadata associated with privacy data collected by enterprises on their websites or web applications, including first party (e.g., first party being a website owner) enterprise privacy metadata and third-party (e.g., third party being first-party partners, customers, affiliates or other third parties) enterprise privacy metadata, declared privacy metadata such as metadata associated with privacy data collection declaration by enterprises. Enterprises declare privacy data collection in a privacy policy, a cookie policy, terms of use (TOU), terms of service (TOS), End User License Agreement (EULA) and other such documents. Privacy regulations metadata refers to metadata associated with privacy data specified in domestic and international privacy regulations that declare the privacy rules and regulations. The user interface suite software 124 supports the user interface for the user interface privacy application 104. The user interface privacy application software 104 is the user interface for the privacy application. Users/Consumers are able access the functionality described herein through this software.

The suite of software components that store metadata 140 include third-party content, code and other data 142 that is used in the enterprise website and web application and running on third-party clusters; enterprise content, code and other data 144 that is resident on an enterprise server cluster and used in the enterprise website and web applications; and enterprise privacy related declarations 146 to the public in a document format. The enterprise privacy related declarations are able to be privacy policy, cookie policy, terms of service, terms of use, end user license agreement and others. Domestic (federal, state and local) and international privacy regulations 148 that specify the rules and regulations associated with privacy data and include collection, retention, usage, sharing, purpose of sharing, transportation of data across boundaries and more.

The web browser 106 and browser extension 100 communicate with the server side 120 and possibly additional servers (e.g., third party servers 142 or web app servers 144) through the Internet 160.

The privacy application including the browser extension and other software components described herein provide information regarding privacy data collection of various websites and web applications. The data enables users/consumers to be aware of the private data (PII, PPI) that is being collected. Users/Consumers are able to then make an informed decision about using the website or web application.

Users/Consumers also participate in the generation of the privacy metadata by using the browser extensions software when they are browsing a website or a web application. This is referred to as crowdsourcing because the users/consumers are able to contribute to the generation of privacy metadata dataset. Initially, the dataset is seeded with privacy metadata from a subset of companies in various industry segments. The dataset will continue to grow and will be automatically updated by the crowdsourcing effort.

Viewing Privacy Metadata

1. Using the privacy awareness application user interface 104 that is accessible from a website, uses/consumers are able to view privacy data collection for a given website or web application. The privacy metadata in the dataset indicates the type of privacy data collected on the website or web application. If the website or web application was not observed by using the privacy awareness extension 100, then the user/consumer is able to use the extension (downloadable from a browser extensions website) to generate the privacy data related metadata and simultaneously visualize the metadata using the application user interface.

2. Using the privacy awareness application user interface 104, users/consumers are able to view the privacy related declarations that are made by a website or web application. This is content from documents such as privacy policy, terms of service, and others. Also, these declarations can be compared with the observed privacy data collection to determine gaps.

3. Using the Privacy Awareness Application user interface, users/consumers are able to view privacy-related regulations that are applicable to a website or web application. This is content from domestic, local and international privacy regulatory documents that are applicable to a website or web application.

Contributing To Privacy Metadata Dataset

Using the privacy awareness extension 100 users/consumers are able to contribute to the privacy metadata dataset when using a website or web application. The extension will non-intrusively (e.g., no code is injected into the Document Object Model (DOM)) observe the website or web application user interface to determine the privacy metadata and pass this information to the dataset suite 122 for processing and identification of the privacy metadata. The privacy metadata is stored in the privacy dataset.

Using the privacy awareness application user interface 104 users/consumers are able to contribute to the declared privacy data collection metadata. The declared privacy metadata is from documents such as privacy policy, cookie policy, and more. Using the privacy awareness application user interface 104 users/consumers are able to contribute to the privacy-related regulations metadata. This is done by editing the rules and restrictions associated with the privacy data.

Figure 2:
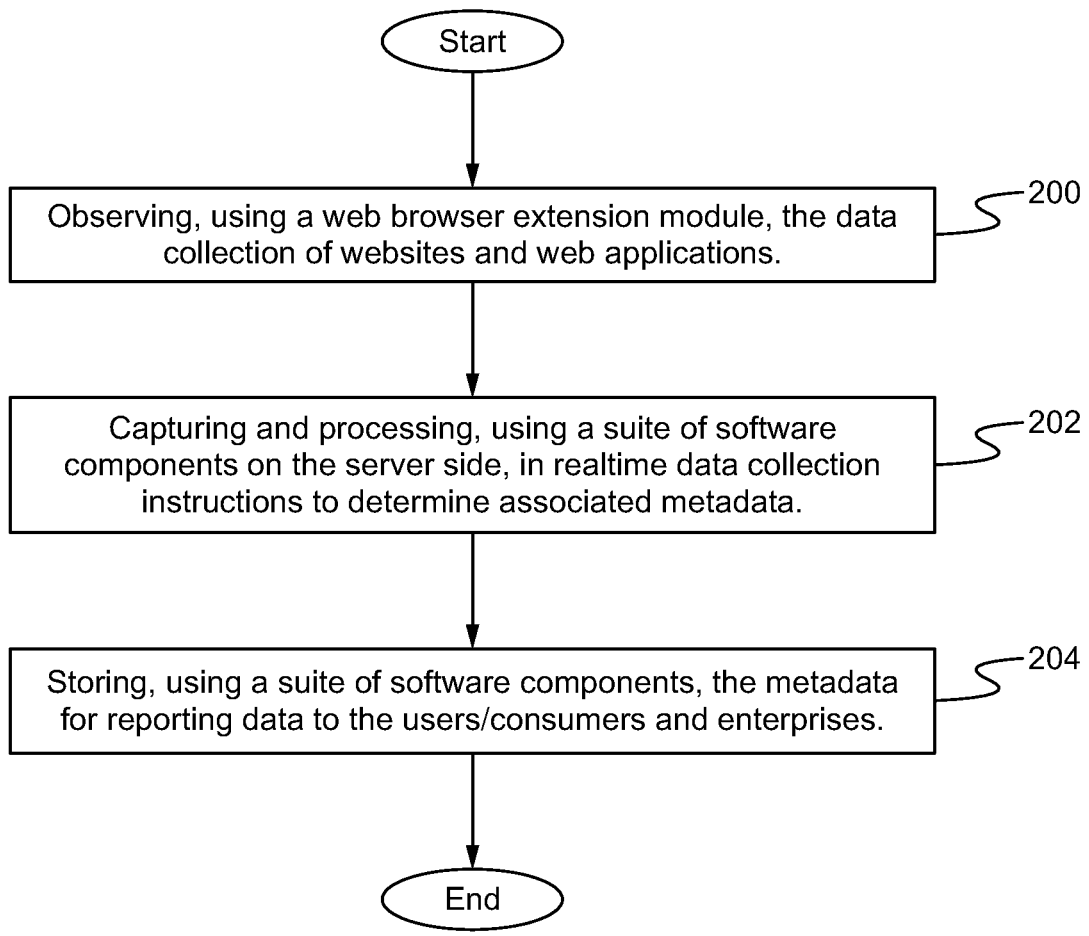
FIG. 2 illustrates a flowchart of implementing a privacy awareness method according to some embodiments.

FIG. 2 illustrates a flowchart of implementing a privacy awareness method according to some embodiments. In the step 200, a web browser extension module non-intrusively observes the data collection of websites and web applications. For example, when a user visits a web page using his browser, the web browser extension module observes the privacy metadata (e.g., who, when, where, and more) being transferred to another website through the web browser. In another example, when a user visits a web page using his browser, the web browser extension module collects privacy metadata from the web page. The privacy metadata is able to be monitored/collected in any manner such as by monitoring a data stream that contains information being sent from the user to the website or a third-party website. The data stream is able to be monitored in any manner such as the browser plug-in monitoring data being sent to a website. Additionally, the privacy metadata is able to be monitored/collected by analyzing html/script/code used by websites, for example, capturing GET and POST information. In another example, collecting the privacy data includes crawling the web site and locating privacy policy information and analyzing/collecting/retrieving the privacy information (e.g., searching for a privacy web page, and copying the contents of the privacy web page). In some embodiments, the user is also able to determine and indicate which privacy data is being acquired/retrieved from the web site such that when multiple users indicate privacy data being acquired, a form of crowdsourcing is implemented. In some embodiments, the step 200 includes only monitoring or observing, and in some embodiments, data is captured as well. In some embodiments, before, during or after the step 200, the privacy metadata dataset is seeded with privacy metadata from a subset of companies in various industry segments. In the step 202, a suite of software components on the server side capture and process in realtime the data collection instructions to determine the associated metadata. As described in the step 200, in some embodiments, a client device (e.g., user mobile device) is able to monitor and/or collect privacy metadata. In some embodiments, a server is able to process/collect privacy metadata. For example, the client device monitors privacy metadata being sent to a third party server, but the server device collects the privacy metadata (e.g., type of metadata such as who, where is the user) being sent. In the step 204, a suite of software components store the metadata for reporting data to the users/consumers and enterprises. In some embodiments, fewer or additional steps are implemented. For example, displaying the privacy metadata in an easily readable chart, or performing comparisons of websites and/or applications to show which websites collect which privacy data. In some embodiments, the order of the steps is modified.

Figure 3:
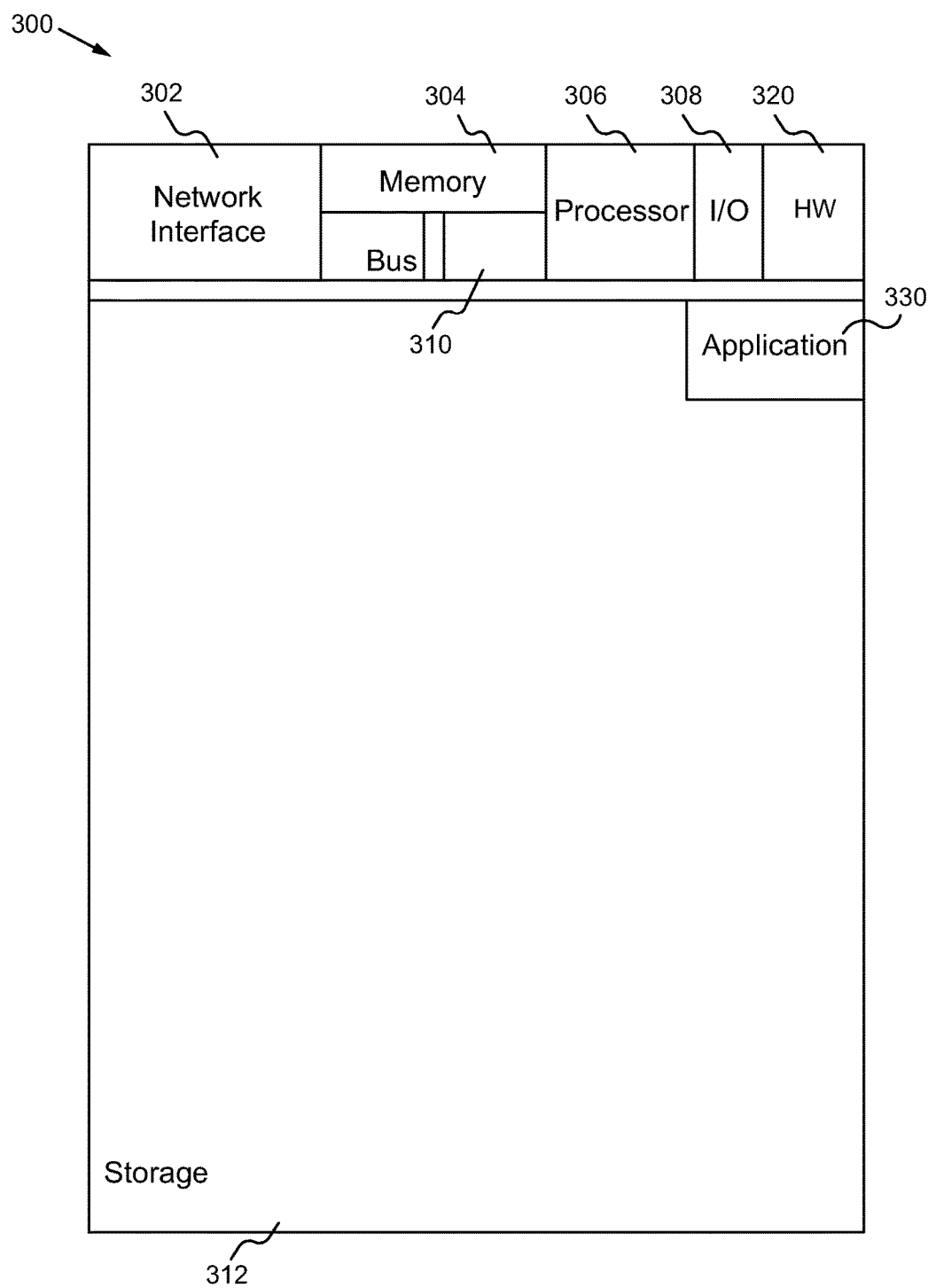
FIG. 3 illustrates a block diagram of an exemplary computing device configured to implement the privacy awareness method according to some embodiments.

FIG. 3 illustrates a block diagram of an exemplary computing device configured to implement the privacy awareness method according to some embodiments. The computing device 300 is able to be used to acquire, store, compute, process, communicate and/or display information. In general, a hardware structure suitable for implementing the computing device 300 includes a network interface 302, a memory 304, a processor 306, I/O device(s) 308, a bus 310 and a storage device 312. The choice of processor is not critical as long as a suitable processor with sufficient speed is chosen. The memory 304 is able to be any conventional computer memory known in the art. The storage device 312 is able to include a hard drive, CDROM, CDRW, DVD, DVDRW, High Definition disc/drive, ultra-HD drive, flash memory card or any other storage device. The computing device 300 is able to include one or more network interfaces 302. An example of a network interface includes a network card connected to an Ethernet or other type of LAN. The I/O device(s) 308 are able to include one or more of the following: keyboard, mouse, monitor, screen, printer, modem, touchscreen, button interface and other devices. Privacy awareness application(s) 330 used to perform the privacy awareness method are likely to be stored in the storage device 312 and memory 304 and processed as applications are typically processed. More or fewer components shown in FIG. 3 are able to be included in the computing device 300. In some embodiments, privacy awareness hardware 320 is included. Although the computing device 300 in FIG. 3 includes applications 330 and hardware 320 for the privacy awareness method, the privacy awareness method is able to be implemented on a computing device in hardware, firmware, software or any combination thereof. For example, in some embodiments, the privacy awareness method applications 330 are programmed in a memory and executed using a processor. In another example, in some embodiments, the privacy awareness hardware 320 is programmed hardware logic including gates specifically designed to implement the privacy awareness method.

In some embodiments, the privacy awareness application (s) 330 include several applications and/or modules. In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, an augmented reality device, a virtual reality device, a home entertainment system, smart jewelry (e.g., smart watch) or any other suitable computing device.

To utilize the privacy awareness method and system, a privacy metadata dataset is seeded with privacy metadata from a subset of companies in various industry segments. The privacy metadata dataset is then automatically updated by user devices with a privacy browser extension or application which monitors and/or acquires privacy metadata as a user browses content online. In some embodiments, the monitoring and/or acquiring of the privacy metadata is implemented on the server-side, client-side (e.g., user device) or a combination of both (e.g., monitoring on the client and acquiring on the server). Depending on the implementation, the privacy metadata acquired is user-specific metadata or generic metadata (e.g., type). For example, the privacy awareness method determines that a user's name and location are acquired by Website X or App Z. The privacy metadata dataset is also able to be updated by users in a crowdsourcing effort. For example, users are able to submit data to the dataset regarding which privacy metadata is acquired from which website or app and/or other information.

In operation, the privacy awareness method and system enable consumers to: obtain notifications about data trackers that are present on a website and their typical activity; obtain information on data trackers that are present on a website and with whom the data is being shared with; review and investigate the enterprise disclosure (e.g., cookie policy) regarding collection of PII and PPI by enterprises on a website; review and investigate the enterprise disclosure (e.g., privacy profile) regarding third-parties (e.g., data collectors, advertisers) affiliated with enterprises; review and investigate the enterprise disclosure (e.g., privacy profile) regarding collection of PII and PPI by third-parties on a website; obtain a list of data privacy related regulations that are applicable to a given enterprise. These regulations will list PII and PPI related collection, retention, usage, transport/movement and transfer restrictions; compare and contrast the enterprise view of privacy data collection and the observed data collection on the website and web applications; compare and contrast the enterprise view of authorized third-parties and the observed third-parties; obtain a clear understanding of the privacy regulations associated with an enterprise and how well the enterprise is meeting the requirements stated in the regulations; and define a profile regarding data disclosure and collection. The profile can be used to specifically grant enterprises the right to use data and for what purpose.

The key advantages of the privacy awareness method and system are: enabling uses/consumers using websites and web applications to be aware of the privacy data collection. The method and system answers the following questions:
What privacy data is being collected?
What is the purpose of data collection?
Is the privacy data distributed and to whom?
What is the purpose of sharing data?
Is the privacy data stored and for how long?
Users/consumers are better able to make an informed decision about what data they are willing to share with a website or web application. The privacy awareness may lead to the following: enterprises managing the privacy data are more aware of third-parties involved in data collection and sharing; enterprises may introduce additional security measures to safeguard privacy data; and enterprises may allow consumers to manage how their privacy data can be used, stored, shared and for what purpose.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method comprising:
   observing, using a web browser extension module programmed in a non-transitory memory of a device, data collection of third-party traffic on websites;
   processing in realtime, data collection instructions to determine associated metadata based on the data collection, wherein the processing in realtime is performed without code injection into the web browser extension module and further wherein the web browser extension module comprises a document object model;
   storing and analyzing the associated metadata for reporting privacy metadata to a user; and
   analyzing the third-party traffic to determine relationships among third-parties for data sharing, and informing a user of the relationships including what data is shared with which third-party.

2. The method of claim 1 wherein the third-party traffic includes at least one of cookies, scripts, server interactions, local document object model HTTP/S calls.

3. The method of claim 1 wherein processing the data collection instructions, analysis and metadata generation are performed using a suite of software components programmed in a server.

4. The method of claim 1 wherein the associated metadata is stored in a privacy metadata dataset.

5. The method of claim 4 further comprising seeding the privacy metadata dataset from a subset of companies.

6. The method of claim 4 further comprising updating the privacy metadata dataset via crowdsourcing.

7. The method of claim 1 further comprising displaying the associated metadata using consumer friendly notifications to the user.

8. The method of claim 1 wherein the associated metadata comprises a type of privacy data collected from a website or application.

9. The method of claim 1 further comprising comparing privacy-related declarations with the associated metadata to determine gaps between the privacy-related declarations and the associated metadata.

10. The method of claim 1 further comprising analyzing servers across the world that are exchanging information, wherein the information includes scripts and user data.

11. The method of claim 1 further comprising comparing advertiser data to provide additional information to the user regarding advertising by an advertiser, wherein the advertiser data is related to the third-party traffic, further wherein the advertiser data includes at least one of images, scripts, and latency information.

12. An apparatus comprising:
   a non-transitory memory for storing an application, the application configured for:
      processing in realtime, data collection instructions to determine associated metadata based on the data collection, wherein the processing in realtime is performed without code injection into a web browser extension module and further wherein the web browser extension module comprises a document object model;
      storing and analyzing the associated metadata for reporting privacy metadata to a user;
      analyzing third-party traffic to determine relationships among third-parties for data sharing, and informing a user of the relationships including what data is shared with which third-party; and
   a processor for processing the application.

13. The apparatus of claim 12 wherein the application is further for observing, using the web browser extension module, data collection of the third-party traffic on websites.

14. The apparatus of claim 13 wherein the third-party traffic includes at least one of cookies, scripts, server interactions, local document object model HTTP/S calls.

15. The apparatus of claim 12 wherein processing the data collection instructions, analysis and metadata generation are performed using a suite of software components programmed in a server.

16. The apparatus of claim 12 wherein the associated metadata is stored in a privacy metadata dataset.

17. The apparatus of claim 16 wherein the application is further for seeding the privacy metadata dataset from a subset of companies.

18. The apparatus of claim 16 wherein the application is further for updating the privacy metadata dataset via crowdsourcing.

19. The apparatus of claim 12 wherein the application is further for displaying the associated metadata using consumer friendly notifications to the user.

20. The apparatus of claim 12 wherein the associated metadata comprises a type of privacy data collected from a website or application.

21. The apparatus of claim 12 wherein the application is further for comparing privacy-related declarations with the associated metadata to determine gaps between the privacy-related declarations and the associated metadata.

22. The apparatus of claim 12 wherein the application is further for analyzing servers across the world that are exchanging information, wherein the information includes scripts and user data.

23. The apparatus of claim 12 wherein the application is further for comparing advertiser data to provide additional information to a user regarding advertising by an advertiser, wherein the advertiser data is related to the third-party traffic, further wherein the advertiser data includes at least one of images, scripts, and latency information.

24. A system comprising:
   a client device configured for storing a web browser extension module to observe data collection of third-party traffic on websites; and
   a server device configured for storing:
      a first suite of software components to process in realtime data collection instructions, analyze and generate privacy metadata associated with the data collection, wherein the processing in realtime is performed without code injection into the web browser extension module and further wherein the web browser extension module comprises a document object model;
      a second suite of software components to store and analyze the privacy metadata for reporting data to a user; and
      analyzing the third-party traffic to determine relationships among third-parties for data sharing, and informing a user of the relationships including what data is shared with which third-party.

25. The system of claim 24 wherein the third-party traffic includes at least one of cookies, scripts, server interactions, local document object model HTTP/S calls.

26. The system of claim 24 wherein the associated metadata is stored in a privacy metadata dataset.

27. The system of claim 26 wherein the privacy metadata dataset is seeded with privacy metadata information from a subset of companies.

28. The system of claim 26 wherein the client device is further for updating the privacy metadata dataset via crowdsourcing.

29. The system of claim 24 wherein the client device is further for displaying the associated metadata using consumer friendly notifications to the user.

30. The system of claim 24 wherein the associated metadata comprises a type of privacy data collected from a website or application.

31. The system of claim 24 wherein the server device is further for comparing privacy-related declarations with the associated metadata to determine gaps between the privacy-related declarations and the associated metadata.

32. The system of claim 24 wherein the server device is further for analyzing servers across the world that are exchanging information, wherein the information includes scripts and user data.

33. The system of claim 24 wherein the server device is further for comparing advertiser data to provide additional information to a user regarding advertising by an advertiser, wherein the advertiser data is related to the third-party traffic, further wherein the advertiser data includes at least one of images, scripts, and latency information.

* * * * *